United States Patent [19]
Schraeder et al.

[11] 3,790,859
[45] Feb. 5, 1974

[54] ELECTRONIC PACKAGE HEADER SYSTEM HAVING OMNI-DIRECTIONAL HEAT DISSIPATION CHARACTERISTIC

[75] Inventors: Charles R. Schraeder; Samuel N. Rea, both of Dallas; Yung Tao, Richardson; Elias G. Hanna, Dallas, all of Tex.

[73] Assignee: Texas Instruments Incorporated, Dallas, Tex.

[22] Filed: Mar. 7, 1972

[21] Appl. No.: 232,502

Related U.S. Application Data

[63] Continuation of Ser. No. 12,749, Feb. 19, 1970, abandoned.

[52] U.S. Cl.......... 317/100, 174/DIG. 3, 174/DIG. 5
[51] Int. Cl. ............................................. H05k 2/20
[58] Field of Search ........ 317/100, 234 A, 101 D, 317/101 H; 174/DIG. 3, DIG. 5, 15 R, 16 R; 165/185

[56] References Cited

UNITED STATES PATENTS

| | | | |
|---|---|---|---|
| 3,341,649 | 9/1967 | James | 174/DIG. 5 |
| 3,514,356 | 5/1970 | Ruppert | 317/101 B |
| 3,508,117 | 4/1970 | Cuzner | 317/100 |
| 3,404,215 | 10/1968 | Burks | 174/52 R |
| 3,626,251 | 12/1971 | Vigue | 317/100 |

OTHER PUBLICATIONS

IBM Tech. Discl. Bull., Ceramic Substrate with Inherent Heat Exchanger, Pilgram, Vol. 12, No. 5, Oct. 1969.

IBM Tech. Discl. Bull., Heat Sink, Coles, Vol. 6, No. 2, July 1963.

*Primary Examiner*—Robert K. Schaefer
*Assistant Examiner*—Gerald P. Tolin
*Attorney, Agent, or Firm*—Harold Levine; James O. Dixon; Gary C. Honeycutt

[57] ABSTRACT

Disclosed is an improved header system for an electronic package of the type used to support and enclose integrated circuits, for example, which system advantageously provides omni-directional heat dissipation characteristics through the novel utilization of a plurality of spaced members that are secured to and protruding from at least one surface of the main body of the header system and are in the flow path of a fluid coolant.

7 Claims, 9 Drawing Figures

Inventors
Charles R. Schraeder
Samuel N. Rea
Yung Tao
Elias G. Hanna

By [signature]
Attorney

ELECTRONIC PACKAGE HEADER SYSTEM HAVING OMNI-DIRECTIONAL HEAT DISSIPATION CHARACTERISTIC

This is a Continuation of U.S. Pat. application Ser. No. 012,749, filed Feb. 19, 1970, now abandoned.

BRIEF DESCRIPTION OF INVENTION AND BACKGROUND INFORMATION

This invention relates to a header system that has heat dissipation means formed thereon, and more particularly, to a header system that advantageously provides omni-directional heat dissipation characteristics.

The thermal dissipation effectiveness of a fluid cooled electronic package of the type containing, for example, integrated circuits, discrete devices, MSI or LSI components, depends mainly upon package size, package construction materials, the number of conductor leads on the package, package orientation to the flow of fluid coolant and the fluid coolant speed. In a conventional high power heat dissipating package, the substrate of the package is usually constructed of a ceramic material, such as alumina, to which the electronic component is secured. For optimum to maximum cooling efficiency ceramic packages are mounted with the electronic component on one surface and the cooling portion provided on the opposite surface so that when it is secured to a printed circuit board, for example, the cooling surface is faced upward away from the mounting surface of the printed circuit board. By this construction flow of fluid coolant is then directed across the cooling surface of the substrate to which the electronic component is attached. This construction advantageously provides a minimum to optimum impedance characteristic to heat removal since the heat generated by the electronic component of the electronic package is dissipated by the high thermal conductivity ceramic substrate which is mounted in direct contact with the flow of fluid in the system. Conventionally, the ceramic surface of the electronic package that is exposed to the fluid flow is a flat surface. Comparative experimentation has surprisingly displayed that a substantial improvement in heat transfer characteristics is achieved by the utilization of the present invention.

The prior art is replete with devices and methods for dissipating heat generated by active and passive components that are supported and enclosed by various types of electronic package configurations. Although prior known techniques and devices for dissipating heat from electronic packages have been satisfactory in many respects, there still remains several unsatisfactory features that have confronted the electronic component and packaging artisan.

By way of example, increasing the electronic package size, length, and/or width, particularly the heat dissipating surface and/or members of the electronic package, has heretofore solved some of the heat dissipating problems presently encountered, but stringent size restrictions imposed upon the electronic scientist have seriously limited the utilization of this design approach.

Component engineers and package designers have also utilized a technique in which the effective surface area of the heat dissipating members of the electronic package are increased within confined length and width dimensions by utilizing a series of uniformly aligned fin-like heat dissipating members extending from the package. Although this latter technique did provide some improvement in heat dissipation characteristics by virtue of the increased heat dissipation surface area of the heat dissipating members within a confined size requirement, it presented another serious problem, i.e., the electronic package had to be oriented with respect to the fluid coolant direction of flow since the finned electronic package was operationally bi-directional insofar as its optimum to maximum heat dissipation capabilities were concerned.

The development and use of improved heat dissipating materials has also assisted the scientists, engineers and designers in fabricating relatively acceptable electronic packages within defined heat dissipating parameters. Such new materials, however, have not provided satisfactory heat dissipation capabilities to adequately achieve the electronic industry's continuous demand for smaller packages having increased numbers of components supported and enclosed therein. Thus, component and package designers have been faced with both size, material and orientation restrictions and heat dissipating requirements that have continuously challenged them insofar as fabrication and final package costs were concerned, insofar as design location of components within a complete system were concerned, and insofar as heat dissipating characteristics within defined package dimensions were concerned.

The present invention advantageously overcomes the electronic package size, material and orientation restrictions and heat dissipating requirements aforementioned, without any significant accompanying increase in package dimensions and design, material or manufacturing costs of such package. Accordingly, this invention uniquely provides an electronic package header system that complies with the desirable size, material and orientation restrictions imposed upon the electronic scientist, yet it advantageously achieves electronic package size and orientation characteristics for heat dissipation purposes with the metes and bounds presently desired by the electronics industry.

In accordance with a preferred embodiment of this invention, a header system for an electronic package is provided that includes heat dissipation means formed thereon, yet omni-directional heat dissipation characteristics are uniquely provided by the incorporation upon the main body portion of the header system of a plurality of spaced members secured thereto and protruding therefrom to produce omni-directional paths for fluid flow of the coolant over such members for effective removal of heat generated by the electronic components supported and confined by the electronic package. Conductor elements are preferably oriented on and secured to the header system for providing electrically conductive paths from the electronic components located within the sealed regions of the electronic package to external regions outside the sealed regions of the electronic package for electrical connection to adjacent, external elements or devices, such as a printed circuit board.

The header system of this invention may be fabricated as an integral part of the main body of the package, or as an additional element secured to the main body of the package in a heat conductive relationship. Furthermore, the plurality of spaced members extending from and secured to the main body of the package may be pyramidally, conically or "waffle" shaped and may be oriented thereon to produce at least two groups of channels, with each group of channels intersecting the other groups of channels to produce at least two groups of intersecting channels. Such intersection of the groups of channels may also be substantially at right angles to produce perpendicularly oriented intersecting groups of channels. Although this preferred embodiment of the header system of this invention utilizes non-conductive materials to form the heat dissipating elements, it is contemplated that selective conductive materials could be also utilized without departing from the inventive spirit herein disclosed.

It is therefore one object of this invention to provide a header system for an electronic package having improved heat dissipation characteristics.

Another object of this invention is to provide an improved header system for an electronic package that advantageously includes omni-directional heat dissipating characteristics.

Another object of this invention is to provide an improved header system for an electronic package that satisfies desired heat dissipating, size, material and package orientation requirements without substantially increasing material and manufacturing costs.

Another object of this invention is to provide an improved header system for an electronic package that is substantially simple in design and relatively inexpensive to manufacture, yet uniquely achieving electronic package size, material and performance characteristics within highly restrictive design parameters.

These and other objects and features of this invention will be readily apparent from the following detailed description when taken in conjunction with the appended claims and the attached drawings.

DETAILED DESCRIPTION

Figure 1:
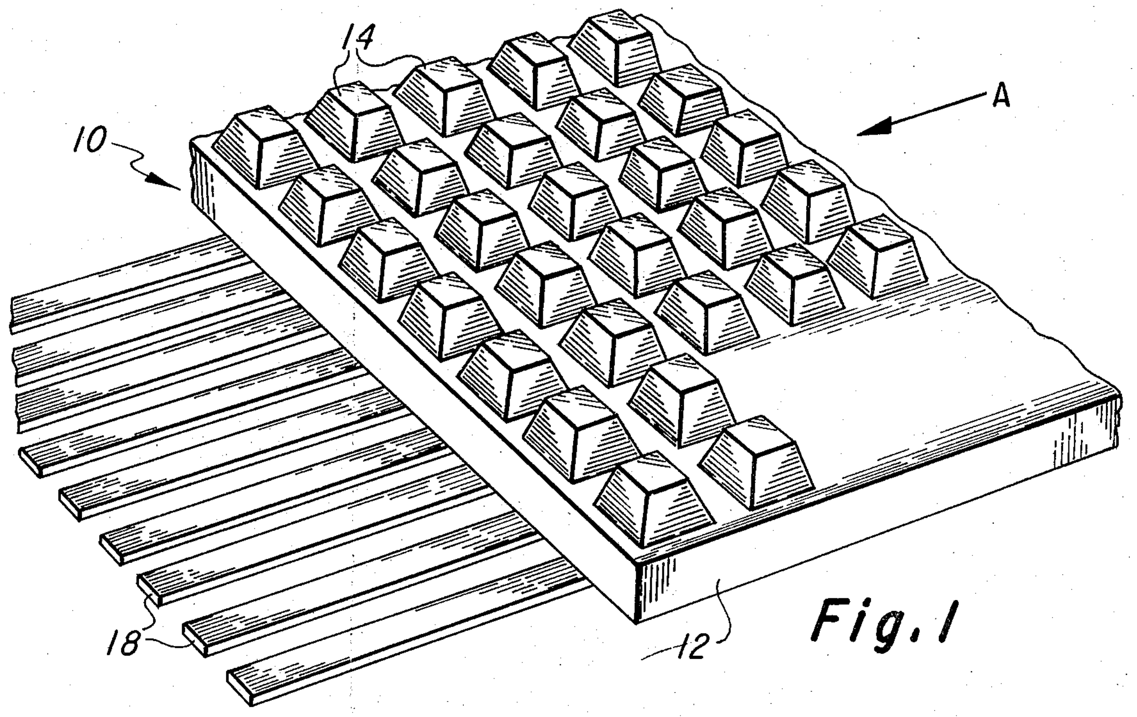
FIG. 1 is a top isometric view of approximately one-half of an electronic package including a header system in accordance with this invention, with such view being partially sectionalized for graphic representation purposes.
Figures 2, 5:
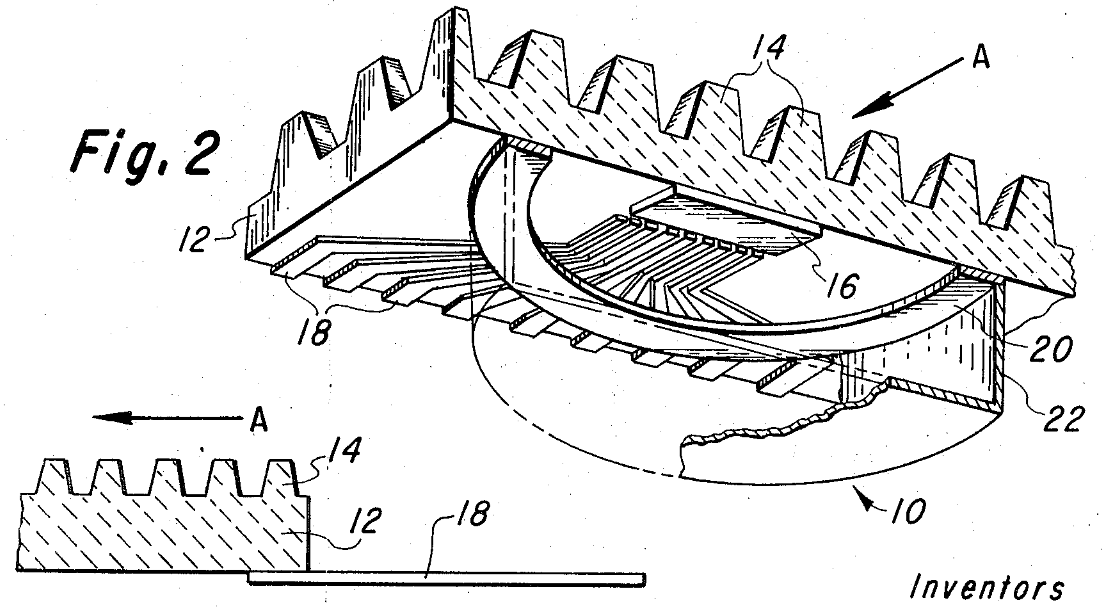
FIG. 2 is a bottom isometric view of approximately one-half of an electronic package including a header system in accordance with this invention, with such view being partially sectionalized for graphic representation purposes.
FIG. 5 is a partial cross-sectional view of the electronic package of FIG. 3 taken along the view plane 5—5.
Figure 6:
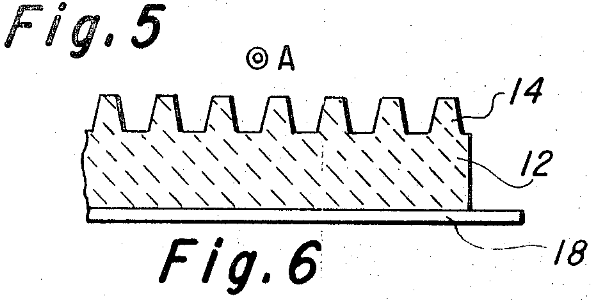
FIG. 6 is a partial cross-sectional view of the electronic package of FIG. 3 taken along the view plane 6—6.

A detailed description of a preferred embodiment of this invention follows with reference being made to the drawings wherein like parts have been given like reference numerals for clarity and understanding of the elements and features of this invention.

A typical electronic package 10 is depicted with graphic simplicity in the several figures of the attached drawings, such electronic package including a main body portion 12, which is preferably made from ceramic material or other non-conductive material, and a plurality of selectively oriented heat dissipating members 14 protruding from the main body portion 12. In this embodiment of the invention the heat dissipating members 14 are integrally formed upon one surface of the main body portion 12, and may be fabricated by well known techniques such as milling, casting or form pressing. Located on the opposite surface of the main body portion 12 are an integrated circuit 16, conductor elements 18, a support ring 20, and a housing 22.

In electronic packages of the type depicted herein, it is conventional to locate the active circuit component, such as the integrated circuit 16, essentially upon the main body portion 12 of the electronic package, and then to selectively secure conductor elements to the surface upon which the electronic component is secured in substantially co-planar relationship thereto so as to provide conductive paths from the internally sealed region of the electronic package to external regions thereof for facilitating electrical connection to external and adjacent components, such as printed circuit boards or similar electronic packages. The conductor elements 18 may be secured upon the main body 12 by conventional lead frame techniques or by conventional photochemical, photolithographical, or photomechanical techniques so as to produce selective electrical conductor paths from the electronic component 16 within the area defined by the housing 22 to areas on the main body 12 outside the area defined by the housing 22, such as one or more of the peripheral edges of the main body 12 as shown in FIGS. 1–6.

It is also conventional to adhesively secure the support ring 20 circumventially about the electronic component 16 and above the conductor elements 18 in a ridigly and hermetically sealed arrangement but insulated from the conductor elements 18. Then with conventionally known techniques the housing 22 is hermetically sealed, preferably to the support ring 20. This hermetically sealed arrangement of the housing 22 may be achieved by adhesively securing, welding or brazing the housing 22 to the support ring 20. By this arrangement the electronic component 16, which is essentially located upon the main body portion of the header system, is hermetically sealed as is a portion of the inner ends of the conductor elements 18. It is contemplated, however, that other known techniques of supporting and enclosing the electronic component 16 may be utilized, or depending upon design conditions and requirements, completely eliminated without departing from the inventive spirit herein disclosed.

Figures 3, 4:
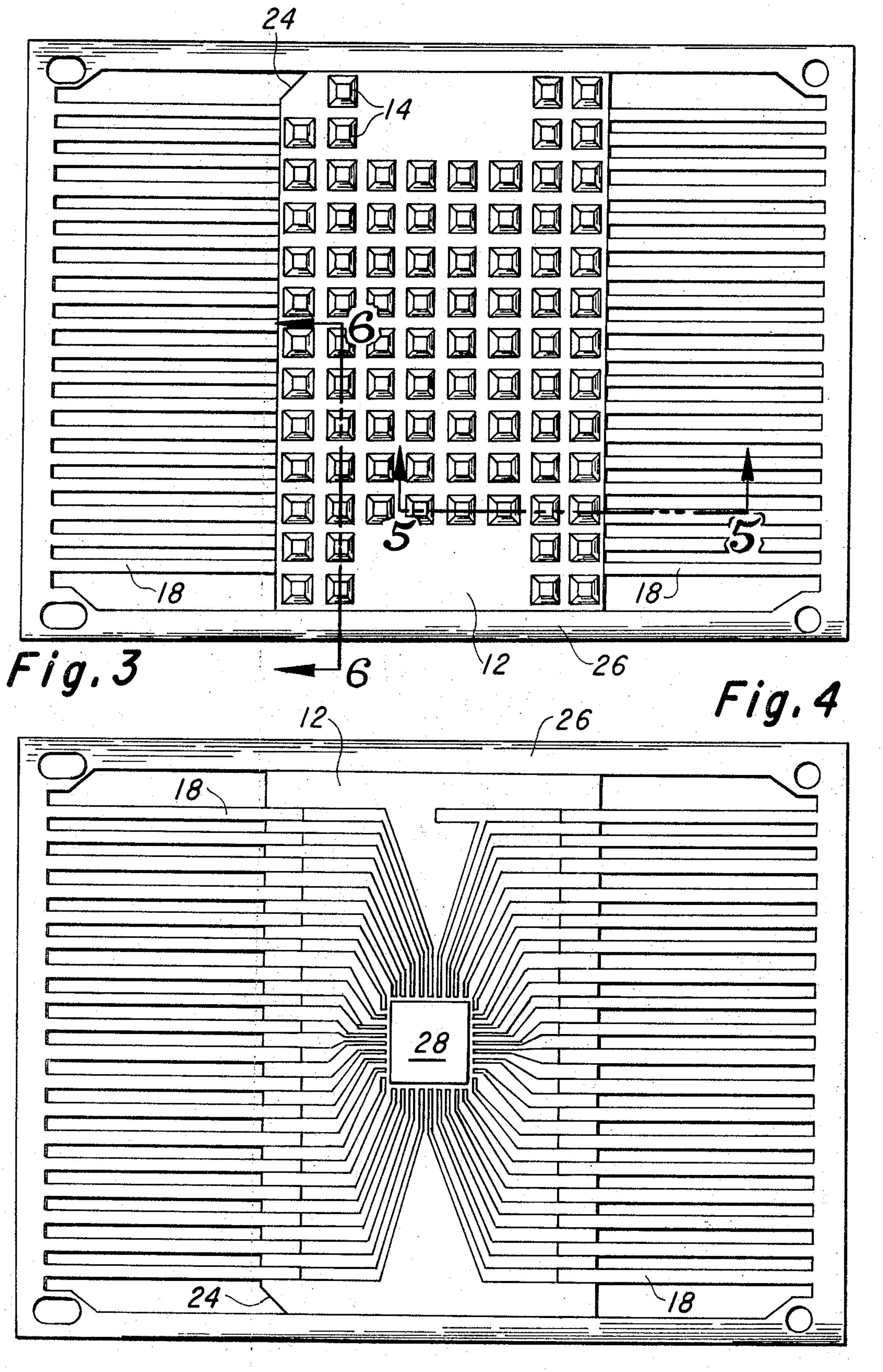
FIG. 3 is a top plan view of an electronic package incorporating a header system in accordance with this invention, with the lead frame shown in position as such would be during fabrication of the electronic package.
FIG. 4 is a bottom plan view of an electronic package incorporating the present invention, with the lead frame shown in position as it would be during fabrication of the electronic package and with the support ring and cover removed to facilitate graphic representation of the conductor metallization that is positioned on the main body of the electronic package for providing external electrical contacts to adjacent components.

In the preferred embodiment of this invention, as depicted in FIGS. 1–6, the main body portion 12 of the electronic package 10, is a rectangle having a length of approximately 1.000 inches and a width of approximately 0.620 inches. The heat dissipating members 14 are "waffle" shaped and formed in a "gridiron" configuration along the central area of one surface of the main body portion 12 in nine rows with each row having eight heat dissipating members. Three of the corner areas of the main body 12 have four heat dissipating members 14 uniformly positioned, while the fourth corner has only three heat dissipating members 14 positioned thereon and includes a chamfered corner 24 to facilitate indexing and control of the electronic package during fabrication. A flat, smooth area at the upper and lower portions of the main body 12, as shown in FIG. 3, is provided so that component identification, and manufacturer monograms and identification, and other pertinent information may be printed or secured thereon. Preferably, the heat dissipating members 14 are positioned on approximately 0.066 inch centers, with a spacing between each heat dissipating member of approximately 0.025 inches. The height of the heat dissipating members 14 may be 0.050 inches with a top area of 0.025 inches square and a side wall angle of approximately 15° off the vertical. The height of the main body portion 12 may be typically 0.020 inches in width and positioned on 0.050 centers.

FIGS. 3 and 4 show respectively top and bottom views of the header system of this invention, with the housing 22, support ring 20 and electronic component 16 removed for graphic simplicity, and shows a conventional metal lead frame positioned and secured to one surface of the main body portion 12. The lead frame 26 is conventionally utilized for holding and positioning the main body portion 12 during fabrication of the electronic package, and is conventionally cut thereafter so as to remove the outer frame portion leaving the conductor elements 18 extending from the main body portion 12. Centrally located on the bottom surface of the main body 12 is a mounting pad 28 which is utilized to secure the electronic component 16 is a desired position upon the main body 12. Of course, with conventional techniques, conductive wires or other forms of conductors are utilized to selectively connect elements of the electronic component 16 to the conductor elements 18. It is contemplated that other well known techniques for providing conductor elements upon the main body 12 may be utilized, for example, metal deposition and selective etching to produce a desired metal conductor pattern upon the main body 12. It is further contemplated that the electronic component may be positioned within and secured to a centrally located recess in the main body 12 and metallized in a manner similar to that disclosed in U.S. Letters Pat. No. 3,484,534, entitled "Multilead Package For a Multilead Electrical Device, " issued to J. S. Kilby et al. on Dec. 16, 1969, which is assigned to the assignee hereof.

Figure 7:
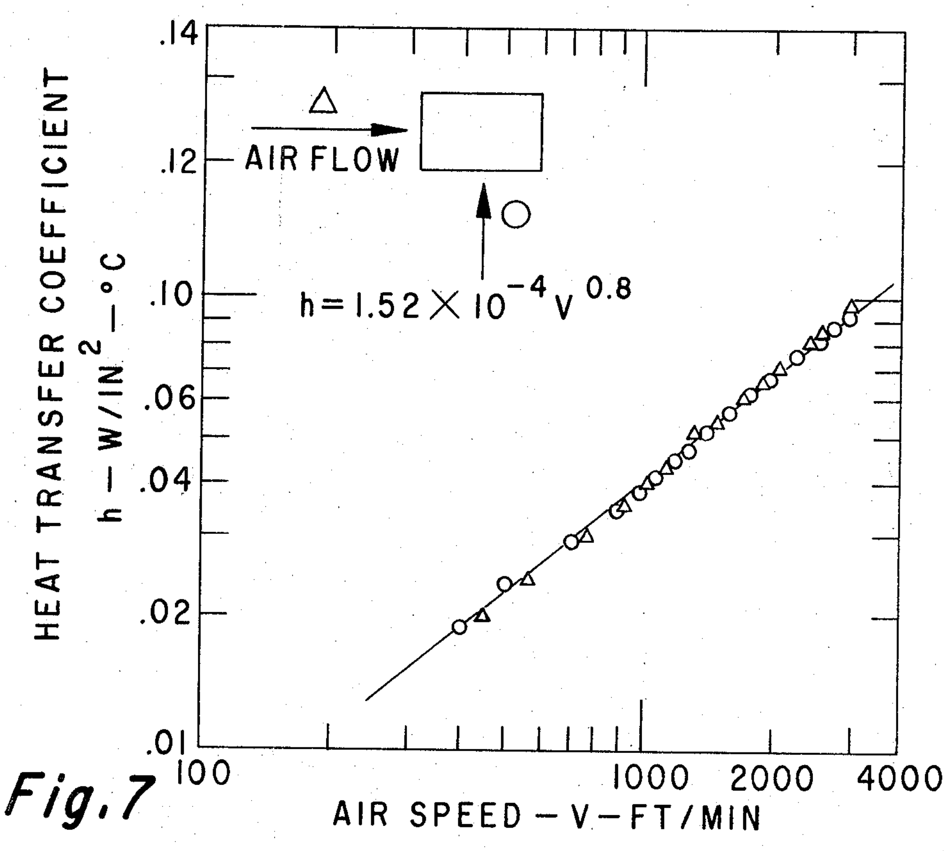
FIG. 7 is a graph showing thermal analysis measurements wherein air speed (V) in feet per minute (fpm) is plotted along the abscissa axis and the heat transfer coefficient (h) in watts per square inch per degree centigrade ($W/in.^2$—° C) is plotted along the ordinate axis.

A thermal analysis and testing of an electronic package having a header system made in accordance with this invention, and a thermal comparison of this novel header system with a conventional "flat-plate" package were made and the results of such analysis and testing is depicted in the graph of FIG. 7 and described below.

A package having an overall dimension of 1 × 0.62 inches was selected for this thermal analysis and comparative test. The protruding heat dissipating members 14 or "waffle-shaped" members 14 were cast integrally with the main body 12 of the header system 10 which was constructed of ceramic material. The spaced members 14 were 50 mils high with a pyramidal tapering from approximately 50 × 50 mils square at the base of the pyramid to approximately 40 × 40 mils square at the top of the pyramid with the top of the pyramid being approximately flat or substantially parallel to the plane of the main body 12 of the header system. The thickness of the overall header system 10 which includes the main body portion 12 and heat dissipating members 14, was approximately 0.15 inches with the heat dissipating members 14 formed on a square "grid iron" pattern of approximately 70 mil centers.

The heat transfer characteristics of the header system of this invention were determined by attaching a relatively small power resistance (not shown) to the back side of the header system 10, mounting the system in an airstream, (not direction arrow A) and then measuring the heat dissipation as a function of the air speed. Main body temperatures were then measured at at least two points by the use of small iron-constanton thermocouples (not shown) that were secured to metallized pads (not shown) on the back side of the main body 12. The heat transfer coefficient $h$ was therefore determined as a function of air speed wherein the heat transfer coefficient h is defined as:

$$h = P/A(T_s - T_a) \qquad (1)$$

where $h$ = heat transfer coefficient ($w/IN^2 - {}^\circ C$)

P = net power dissipated from the surface (W)

A = total surface area exposed to the airstream ($IN^2$)

$T_2$ = substrate temperature (° C)

$T_a$ = free airstream temperature (° C)

FIG. 7 graphically represents the result of the aforementioned heat transfer thermal analysis and test procedure. It was determined that the heat transfer coefficient h is proportional to $(V)^{0.8}$, wherein V represents air speed. This functional dependency is a characteristic of the turbulent "flat plate" heat transfer, and indicates that the protruding spaced members 14 induced relatively high turbulence, thereby advantageously enhancing the heat transfer characteristics of the electronic package 10. Furthermore, it was observed that the heat transfer coefficient of an electronic package in accordance with this invention is independent of air flow direction with respect to orientation of the electronic package 10 and with respect to the heat dissipating members 14, thus providing an unexpected omnidirectional heat dissipation characteristic heretofore not achievable with the conventional "flat plate" or "fin type" heat transfer techniques. Therefore, when relatively laminar flow is obtained, such as when "flat plate" heat transfer packages are utilized having substantially smooth surfaces and dimensions the same as aforementioned and with air speeds comparable to those aforementioned, the heat transfer coefficient is dependent upon flow direction, does not achieve any significant turbulent flow, and does not demonstrate any noticeable enhancement of heat transfer characteristics. Therefore for laminar flow "flat plate" type electronic packages:

$$hl/k = 0.664\ [(VL/\nu)]\ ½\ (PR)\ ⅓ \qquad (2)$$

where $h$ = heat transfer coefficient ($W/IN^2 - °C$)
L = package length parallel to air flow (inches)
$k$ = fluid thermal conductivity ($W/IN - °C$)
V = fluid speed (IN/SEC)
$\nu$ = fluid kinematic viscosity ($IN^2/SEC$)
PR = fluid Prandtl member (dimensionless)

Equation 2 therefore indicates that in laminar flow the heat transfer coefficient is proportional to (V) and inversely proportional to (L) . It is reasonable to conclude therefore that a rectangular flat package will exhibit a higher heat transfer coefficient when the air flow is transverse, i.e., parallel to the shorter package dimension (Note the circles in the graph of FIG. 7).

Of somewhat more interest than the aforementioned heat transfer coefficient insofar as rectangular flat packages are concerned is the product of the heat transfer coefficient ($h$) and the total surface area (A) exposed to air flow ($h$A) which has dimensions of W/° C. Thus, the reciprocal of this product is essentially the package case-ambient thermal impedance, $\theta_{CA}$. Accordingly, the higher the product $h$A the lower is $\theta_{CA}$ and in general the cooler the package will operate. In FIG. 1 the total surface area of the cooling surface, which includes the sidewalls and tops of the heat dissipating members 14, is approximately 1.78 square inches. However in an equivalent overall sized package utilizing a "flat plate" cooling surface the total surface area would be approximately 0.94 square inches. A comparison of the equivalent "flat plate" packages with the "waffle" shaped electronic package of the present invention is shown in the following table:

FLAT PLATE v. WAFFLE SHAPE PACKAGE

| Air Speed (FPM) | h($W/IN^2$–°C) | hA(W/°C) | I/hA ($\theta_{IC}$) |
|---|---|---|---|
| 500 | 0.032 v 0.022 | 0.030 v. 0.039 | 33.3 v 25.6 |
| 1000 | 0.045 v 0.039 | 0.042 v 0.069 | 23.8 v 14.5 |
| 2000 | 0.065 v 0.068 | 0.061 v 0.121 | 16.4 v 8.3 |

In the above table, the "flat plate" heat transfer coefficient $h$ was computed from equation (2) above for transfer flow with package length L being approximately 0.62 inches. The heat transfer coefficient $h$ for a "waffle" shaped package made in accordance with this invention was taken from the data as shown in the FIG. 7 graph. As seen from the FIG. 7 graph, for examplary air speeds of approximately 500 to approximately 1,000 feet per minute, the "waffle" shaped package provided approximately 20 to 40 percent reduction in case ambient thermal impedance from that of a comparable "flat plate" package.

It is contemplated that other shaped spaced members may be utilized to further enhance and improve the heat transfer characteristics of an electronic package. It can be seen therefore that the several mentioned objects and advantages are uniquely achieved by virtue of the utilization of spaced members secured and protruding from the outside surface at the main body of the header system in accordance with this invention, i.e., turbulent flow is produced by the protruding spaced members surprisingly enhancing heat dissipation characteristics, a substantial increase in surface area is obtained for enhancing heat dissipation characteristics, and a uniform heat transfer coefficient is provided that is independent of air flow direction with respect to electronic component orientation to produce omnidirectional heat dissipation characteristics.

Figure 8:
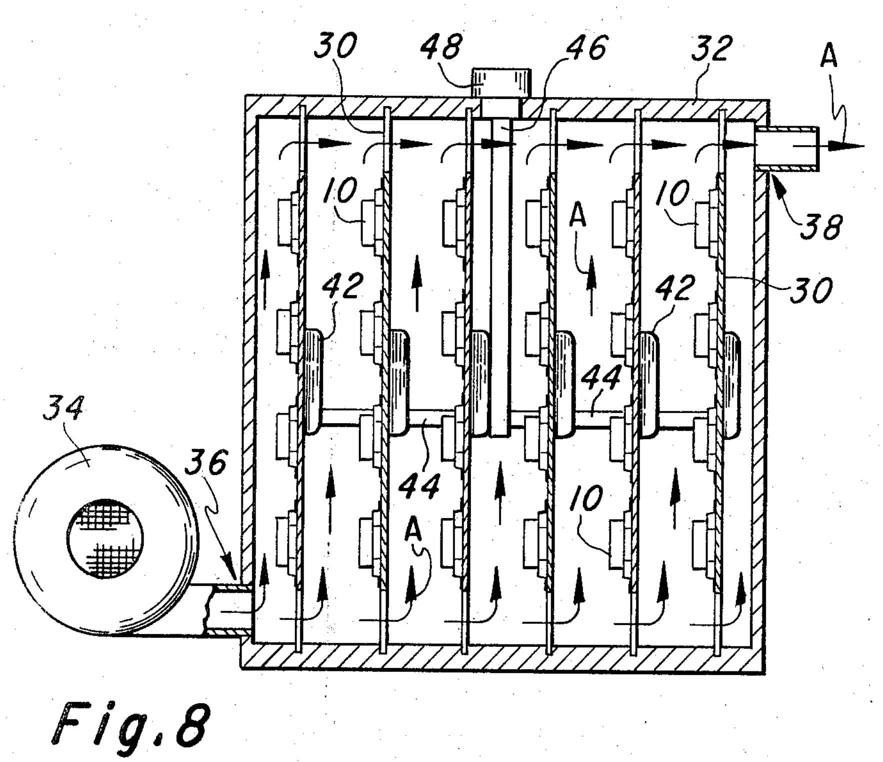
FIG. 8 is a cross-sectional view of a system containing a plurality of spaced, parallel oriented, printed circuit boards, with each circuit board having a plurality of spaced electronic packages utilizing the header system of this invention, and blower means for fluid coolant circulating and heat transfer purposes.
Figure 9:
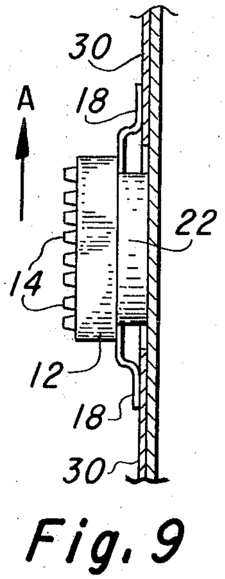
FIG. 9 is a side view of one of the electronic packages of FIG. 8 with the printed circuit board to which it is secured being shown in partial cross-section.

FIGS. 8 and 9 graphically represent in cross-sectional view a simple system containing (1) a plurality of electronic packages 10 having a header system pursuant to this invention mounted on respective printed circuit boards 30, (2) a closed support 32 for releasably holding and positioning the printed circuit boards 30, (3) a blower 34 connected to an intake opening 36 for forcing a fluid coolant, such as cool, dry air, into the closed support 32, (4) an exhaust opening 38 for removing the heated fluid coolant after it has passed over the electronic packages 10 as shown by the direction-of-flow arrows A, and (5) an electrical conductor system including printed circuit board connectors 42, secondary conductor conduits 44, primary conductor conduit 46, and external connector 48, which are interconnected to electrically connect selected elements of each electronic package 10 to selected terminals of the connector 48 via the printed circuit boards 30, connectors 42, secondary conduit 44, and primary conduit 46. In operation, when the blower 34 is operating cool air is forced through the support 32 as depicted by the flow arrows A, across the electronic packages 10 and out the exhaust 38. The system of FIGS. 8 and 9 may be a closed system wherein the exhausted fluid coolant may be dehumidified and cooled to a desired temperature and fed back to the blower 34 via exhaust conduits (not shown). It is also contemplated that the system of FIGS. 8 and 9 may be reversed wherein the fluid coolant, such as ambient air, enters at the opening 38 and exhausts at the opening 36 with an appropriate pump (not shown) substituted for the blower 34. It is anticipated that any known fluid coolant and coolant control techniques may be utilized in combination with this invention so long as such are compatible with the performance, structural and electrical characteristics of the electronic packages utilized in the system.

It will be apparent from the foregoing description in light of the attached drawings that the present invention uniquely provides a header system for an electronic package that has improved heat dissipation characteristics including omni-directional heat dissipating capabilities, yet such improved header system satisfies desired heat dissipating, package size, material and orientation requirements within reasonable design, material and manufacturing cost parameters. The header system of the present invention is substantially simple in design and relatively inexpensive to manufacture, yet it advantageously achieves electronic package size, material and performance characteristics within highly restrictive design parameters.

The present invention has been described and defined in detail and illustrated in preferred embodiments. It will be apparent, therefore, to one skilled in the arts herein encompassed, that many changes and modifications are possible within the ordinary skill of such artisans without departing from the spirit of and the contemplated scope of the invention described, defined and illustrated herein.

What is claimed is:

1. An electronic package header system for an electronic component of the type that is cooled by a fluid coolant passing over major surfaces thereof, said header system having a substantially uniform heat transfer coefficient and omni-directional heat dissipating characteristics and comprising in combination:

a main body portion of non-conductive material and defining a plate-like member having opposite first and second major surfaces, an electronic component mounted on the first major surface of said main body portion, said main body portion including a plurality of selectively oriented, spaced projections of non-conductive material integrally formed on and extending outwardly from the second major surface thereof and defining a unitary one piece structure therewith, said projections being so arranged as to produce relatively high turbulence of the flow of a fluid coolant passing over surfaces thereof to provide enhanced heat dissipating characteristics for said main body portion, a bonding pad selectively positioned on the first major surface of said main body portion, said electronic component being secured to said bonding pad in fixed relation to the first major surface of said main body portion, and a plurality of spaced flat conductor members selectively formed on and fixed to the first major surface of said main body portion in contiguous engagement therewith, said plurality of flat conductor members being selectively electrically connected to said electronic component and extending along the first major surface of said main body portion beyond the outer marginal edge thereof for selective electrical connection to adjacent external components so as to electrically interconnect said electronic component thereto.

2. A header system as set forth in claim 1, wherein said main body portion and said plurality of spaced projections integrally formed on and extending outwardly from the second major surface thereof are made of ceramic material.

3. A header system as set forth in claim 2, wherein each of said plurality of spaced projections is shaped as a pyramid having an apex in the form of a flat surface lying in a plane disposed in substantially parallel relationship with respect to the plane of the second major surface of said main body portion.

4. A header system as set forth in claim 3, wherein said spaced projections are arranged in a plurality of rows and columns so as to present two groups of channels extending across said plurality of spaced projections in substantially perpendicular relationship with respect to each other.

5. A header system as set forth in claim 4, further including a support ring insulatively affixed to the first major surface of said main body portion and surrounding said electronic component, said support ring overlying respective intermediate portions of said plurality of flat conductor members disposed on the first major surface of said main body portion, and a housing adhesively and hermetically sealed to said support ring and enclosing said electronic component and the portions of said plurality of flat conductor members located within said support ring, said housing extending outwardly from the first major surface of said main body portion.

6. A system of electronic packages of the type that is cooled by a fluid coolant passing over major surfaces of said packages comprising in combination:

a main housing having intake means and exhaust means;

means connected to said intake means for providing a flow of fluid coolant through said main housing to said exhaust means;

a plurality of printed circuit boards fixedly secured within said main housing in spaced parallel relation to each other and including openings therethrough to provide for the flow of fluid coolant across each of said printed circuit boards in a path of flow extending between said intake means and said exhaust means of said main housing;

a plurality of electronic packages affixed to said plurality of printed circuit boards and disposed in the path of flow to be taken by the fluid coolant in passing through said main housing; and each of said electronic packages including a header system having a substantially uniform heat transfer coefficient and omni-directional heat dissipating characteristics;

each of said header systems including a main body portion of nonconductive material in the form of a plate-like member having opposite first and second major surfaces, an electronic component mounted on the first major surface of said main body portion, said main body portion including a plurality of selectively oriented, spaced projections of non-conductive material integrally formed on and extending outwardly from the second major surface thereof and defining a unitary one piece structure therewith, said projections being so arranged as to produce relatively high turbulance of fluid coolant flow thereacross for enhancing the heat dissipating characteristics of said main body portion, a bonding pad selectively positioned on the first major surface os said main body portion, said electronic component being secured to said bonding pad in fixed relation to the first major surface of said main body portion, and a plurality of spaced flat conductor members selectively formed on and fixed to the first major surface of said main body portion in contiguous engagement therewith, and extending thereacross beyond the marginal edge thereof so as to include respective conductor portions disposed outwardly with respect to the marginal edge of said main body portion, said flat conductor members providing selective electrical connections between said electronic component and at least one circuit element of one of said printed circuit boards so as to electrically interconnect said electronic component thereto.

7. A system of electronic packages as set forth in claim 6, wherein said main body portion and said plurality of spaced projections integral therewith of each said header system are made of ceramic material, and each of said plurality of spaced projections is shaped as a pyramid having an apex in the form of a flat surface lying in a plane disposed in substantially parallel relationship with respect to the plane of the second major surface of said main body portion corresponding thereto.

* * * * *